(No Model.)
A. F. DICE.
BARBED WIRE SPOOL.
No. 318,967. Patented June 2, 1885.
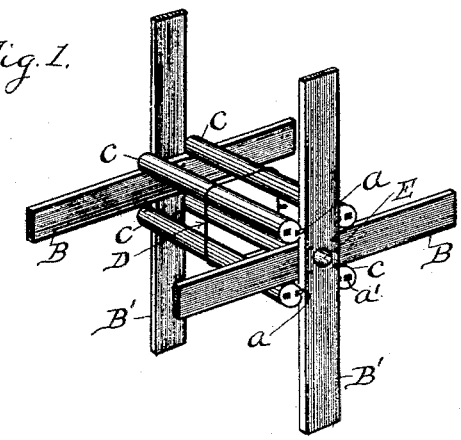
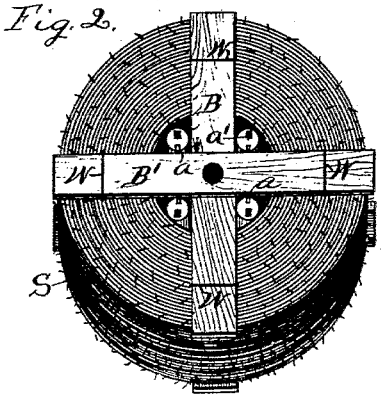
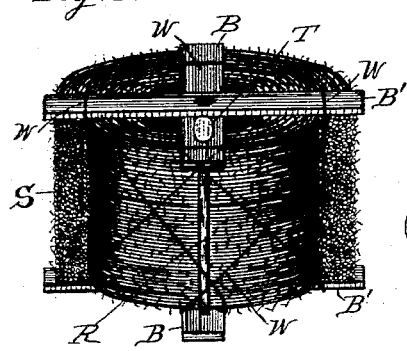
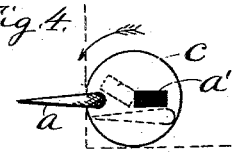
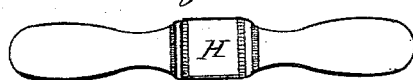
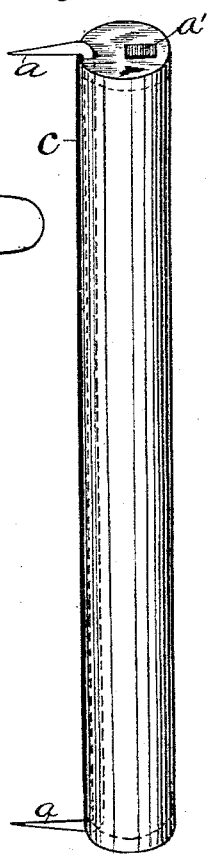
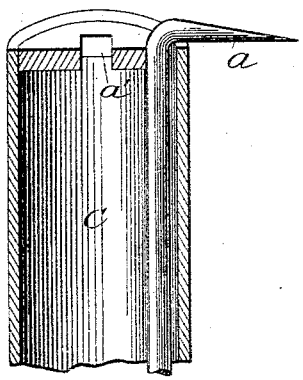
Witnesses
Enoch Evans
Arthur Felt
Inventor.
Andrew F. Dice.

UNITED STATES PATENT OFFICE.

ANDREW F. DICE, OF JOLIET, ILLINOIS.

BARBED-WIRE SPOOL.

SPECIFICATION forming part of Letters Patent No. 318,967, dated June 2, 1885.

Application filed October 23, 1884. (No model.)

*To all whom it may concern:*

Be it known that I, ANDREW F. DICE, a citizen of the United States of America, residing at Joliet, in the county of Will and State of Illinois, have invented certain new and useful Improvements in Barbed-Wire Spools, of which the following is a specification, reference being had therein to the accompanying drawings.

Figure 1 is a perspective view of a spool for spooling wire. Fig. 2 is a perspective view of the same, having barbed wire wound thereon. Fig. 3 is another perspective view of the same, having a portion of the barbed wire wound thereon broken away to show wire cross-ties for connecting the two heads of the spool. Fig. 4 is an end view of one of the tubular cross-bars of the spool. Fig. 5 is a perspective view of one of the tubular cross-bars of the spool detached therefrom; and Fig. 6 is a perspective view of the key for rotating said cross-bars to detach them from the two heads, and for removing them from the spool after the wire is wound thereon. Fig. 7 is a vertical section through a part of one of the tubular cross-bars, showing the hinged prod and the key-aperture for rotating said cross-bar.

This invention relates to certain improvements in spools for wire, and more especially for barbed wire, which improvements consist, principally, in so constructing the spool that its central cross-bars may be removed after the spool has been wound full of wire, and after the two heads of the spool have been united by means of cross-ties placed therein or thereon while the wire is being wound on the spool.

Referring to the drawings, Fig. 1 shows a perspective view of the spool before any wire is wound thereon, and before its two heads have been tied together or united by cross wire ties. The heads of the spool consist of the wooden cross-bars B and B', secured together at their cross by means of nails or otherwise, as shown, and having the ordinary central aperture for use in passing a rod or bar through to handle the spool. The two heads of the spool are united by means of the four tubular cross-bars, c, as shown in Figs. 1 and 2. The ends of these tubular cross-bars c are closed by a cap or head, as shown particularly in Fig. 5, which caps or heads are each provided with two apertures, as shown in said figure, the aperture $a'$ being for the reception of the key K, (shown in Fig. 6,) for the purpose of furnishing means for rotating the cross-bar and removing it from the spool, and the other apertures being for the reception of a rod passing lengthwise through the tubular cross-bar next to one side, and terminating at either end in a sharp prod, $a$, bent to point at right angles with the cross-bar C. These prods $a$ furnish the means for attaching the cross-bars $c$ to the heads of the spool, which is accomplished by driving them into the wooden cross-bar B at the angle of its intersection with cross-bar B', as shown in Figs. 1 and 2. By this means the two heads of the spool are united and held in proper position until the wire can be wound thereon.

To prevent the prods $a$ from being prematurely pulled out from the cross-bars B, a wire tie, D, is wound around all the tubular cross-bars $c$, as shown in Fig. 1, which holds the spool securely together until the wire can be wound on it. While the wire is being wound on the spool, and before it is wound full, the two heads are tied together by means of the wire cross-tie W, as shown in Fig. 3. The tie W passes from one cross-bar of the head diagonally across to a cross-bar of the opposite head, passing around said cross-bars near their outer ends, as shown in said figure, and in the manner therein illustrated, to hold the two heads together on the sides of the bale of wire. After the wire tie W is thus placed on the spool, the remainder of the wire is wound on the spool, so that the tie W is inclosed within the bale of wire wound on the spool, as shown in Fig. 3, so that there is no possibility of its becoming displaced or being removed. After the tie W is thus placed on and the spool is wound full of wire, it is intended to remove the cross-bars $c$ from the center of the spool, so that the two heads of the spool will be held together on the bale of wire simply by means of the wire tie W, as shown in Fig. 3. This is accomplished from either end of the spool by inserting the key K in the rectangular aperture $a'$, and then turning said key, which will rotate said tubular cross-bars $c$, and thereby withdraw the prods $a$ from the cross-bars B, leaving them in the position shown by the dotted lines in Fig. 4. The key is then withdrawn until its part Z near its lower end is in the aperture $a'$ of the head of cross-bar $c$, when it is turned so its head P will be crosswise with said aperture. When in such position, its head P will catch under the head of cross-bar $c$, and thus furnish means for removing the said cross-bar by pulling on said key. By this means all of the cross-bars $c$ can be removed from the spool, and the package or bale of wire can be sent to market in the form shown in Fig. 3, thus leaving the opening through the bale free, to save paint and reduce the cost of the spool, as the tubular cross-bars $c$ are constructed of metal and intended to be a part of the barbing-machine when the spool is used for barbed wire, and all the part of the spool it is necessary to manufacture is the two wooden heads. The tie-wire W may not be applied to the bale until all the wire is wound on the spool, if desired, in which case the heads B B' would have to extend a little beyond the bale to furnish room to attach the tie; but generally the tie-wire W would be applied as shown in Fig. 3.

The key for rotating and removing the tubular cross-bars $c$ is shown in Fig. 6, and consists of the handle H and stem K, formed to enter the aperture $a'$, as stated, and terminating at its lower end in the smaller portion Z, so it can rotate in said aperture $a'$ to turn its head P, so it can catch under the head of said cross-bar to withdraw it, as stated. By the use of these tubular cross-bars $c$, formed alike on each end, they may be removed from the spool from either side without the necessity of turning it over. In order to prevent the bale from being crushed after the cross-bars $c$ are removed, and when a large number of bales are piled up on each other, the supporting-posts R are used to stand between the two cross-bars B B within the bale, and placed therein at the time the tie-wire W is placed therein. These posts may be placed between all the bars of the heads, but generally only two are used, placed as shown in Fig. 3. These posts are held in position by the remainder of the wire when the spool is wound full, and thoroughly prevent any compression or crush of the bale.

T represents the shipping-tag attached to the cross-bar B, next the bale, next the other cross-bar, B', which furnishes protection to the shipping-tag and prevents it from being detached.

Having thus described my invention, what I claim as new, and desire to secure by Letters Patent, is as follows, to wit:

1. In a spool for spooling wire, the removable rotating cross-bars $c$, having the prods $a$ hinged thereto, as shown, and key-aperture $a'$, in combination with the tie-wire D and ends or heads of the spool, as and for the purpose set forth.

2. A spool for spooling wire, formed of the two wooden ends or heads B B' and the removable rotating cross-bars $c$, formed of metal tubes, and having the prods $a$ hinged thereto, as shown, for connecting said heads, and key-aperture $a'$, substantially as and for the purpose set forth.

3. In a spool for spooling wire, the removable rotating tubular cross-bars $c$, having the hinged prods $a$ attached thereto, as shown, and key-aperture $a'$, in combination with the heads B B' of the spool, by means of which cross-bars said heads are detachably connected, substantially as and for the purpose set forth.

4. The combination of the heads B B', tubular cross-bars $c\,c$, having the hinged prods $a$ and key-aperture $a'$, wire W, and supporting-posts R R, arranged to stand between the arms of said heads loosely and within the wire wound on the spool, and held in place by said wire coil, as and for the purpose set forth.

5. The combination of the heads B B', tubular cross-bars $c$, having the hinged prods $a$ and key-aperture $a'$, and wire W, as and for the purpose set forth.

ANDREW F. DICE.

Witnesses:
 ENOCH EVANS,
 ARTHUR FELT.